US011301000B2

(12) United States Patent
Feng (10) Patent No.: US 11,301,000 B2
(45) Date of Patent: Apr. 12, 2022

(54) FLEXIBLE DISPLAY PANEL (71) Applicant: WUHAN CHINA STAR OPTOELECTRONICS SEMICONDUCTOR DISPLAY TECHNOLOGY CO., LTD., Hubei (CN)

(72) Inventor: Xiaoliang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 170 days.

(21) Appl. No.: 16/341,903

(22) PCT Filed: Jan. 17, 2019

(86) PCT No.: PCT/CN2019/072131
§ 371 (c)(1),
(2) Date: Apr. 14, 2019

(87) PCT Pub. No.: WO2020/113788
PCT Pub. Date: Jun. 11, 2020

(65) Prior Publication Data
US 2020/0174525 A1    Jun. 4, 2020

(30) Foreign Application Priority Data
Dec. 4, 2018   (CN) .......................... 201811472307.6

(51) Int. Cl.
*G06F 1/16*     (2006.01)
*G02F 1/1333*   (2006.01)
(Continued)

(52) U.S. Cl.
CPC .......... *G06F 1/1652* (2013.01); *G02F 1/1339* (2013.01); *G02F 1/13338* (2013.01);
(Continued)

(58) Field of Classification Search
CPC .. G06F 3/04; G06F 3/045–047; G06F 3/0412; G06F 3/04112; G06F 3/044;
(Continued)

(56) References Cited

U.S. PATENT DOCUMENTS 6,734,940 B2 *  5/2004  Hirabayashi ...... G02F 1/136204
                                                    349/149
7,948,477 B2 *  5/2011  Hotelling ................ G06F 3/047
                                                    345/173
(Continued)

FOREIGN PATENT DOCUMENTS

CN       103513825 A       1/2014
CN       103713794 A       4/2014
(Continued)

*Primary Examiner* — Tuan T Dinh
(74) *Attorney, Agent, or Firm* — Mark M. Friedman (57) ABSTRACT

A flexible display panel is provided, defining a display area, a bonding area, and a border area, and including a flexible substrate, a protective layer, a semiconductor layer, and a touch layer. A gate lead trace, a ground trace, a touch sensor receiving electrode lead trace, and a display area pad are disposed on the flexible substrate corresponding to the display area. The protective layer corresponding to the border area is provided with a first through hole, and the gate lead trace is electrically connected to a gate of the semiconductor layer through the first through hole. The disclosure has advantages of changing a traditional trace position, adopting a hidden trace design, and designing the trace in the same position as the display area, so that no additional space is occupied, and a non-display area is reduced, thereby effectively reducing a trace width in an edge of a panel.

5 Claims, 10 Drawing Sheets

(51) Int. Cl.
*G02F 1/1362* (2006.01)
*G02F 1/1335* (2006.01)
*G02F 1/1339* (2006.01)

(52) U.S. Cl.
CPC .. *G02F 1/133305* (2013.01); *G02F 1/133528* (2013.01); *G02F 1/136286* (2013.01); *G06F 1/1643* (2013.01); *G02F 1/136295* (2021.01)

(58) Field of Classification Search
CPC ............... G06F 3/0443; G06F 3/0446; G06F 1/133–136; H01L 27/32; G02F 1/33; G02F 1/1333; G02F 1/36; G02F 1/345
USPC ............. 361/749–750, 760, 767, 782–784, 361/794–795, 803; 174/254–260
See application file for complete search history.

(56) References Cited

U.S. PATENT DOCUMENTS

| | | | | |
|---|---|---|---|---|
| 8,988,371 | B2* | 3/2015 | Ho | G06F 3/0445 |
| | | | | 345/173 |
| 9,853,092 | B2* | 12/2017 | Lee | G06F 3/0446 |
| 10,133,421 | B2* | 11/2018 | Shepelev | G06F 3/04164 |
| 2003/0052867 | A1* | 3/2003 | Shigetaka | G06F 3/0446 |
| | | | | 345/173 |
| 2003/0103181 | A1* | 6/2003 | Imayama | G02F 1/133345 |
| | | | | 349/122 |
| 2005/0048224 | A1* | 3/2005 | Araya | C09B 68/443 |
| | | | | 428/1.3 |
| 2006/0244741 | A1* | 11/2006 | Kimura | G02F 1/1368 |
| | | | | 345/204 |
| 2016/0117031 | A1* | 4/2016 | Han | G06F 3/0443 |
| | | | | 345/174 |
| 2016/0350570 | A1* | 12/2016 | Han | G06F 3/04164 |
| 2016/0372490 | A1 | 12/2016 | Zhang et al. | |
| 2017/0179431 | A1* | 6/2017 | Kang | H01L 27/3262 |
| 2017/0194411 | A1* | 7/2017 | Park | H01L 51/5259 |
| 2017/0255306 | A1 | 9/2017 | Xie et al. | |
| 2017/0287394 | A1* | 10/2017 | Kim | H01L 27/3276 |
| 2018/0032190 | A1* | 2/2018 | Koide | G06F 3/0446 |
| 2018/0074357 | A1 | 3/2018 | Chen et al. | |
| 2018/0166520 | A1* | 6/2018 | Kang | H01L 27/3211 |
| 2018/0239492 | A1 | 8/2018 | Hashimoto | |

FOREIGN PATENT DOCUMENTS

| | | |
|---|---|---|
| CN | 104570515 A | 4/2015 |
| CN | 105138184 A | 12/2015 |
| CN | 106445230 A | 2/2017 |

* cited by examiner

FIG. 5 a gate lead trace, a ground trace, a touch sensor receiving electrode lead trace, and a display area pad are formed on a flexible substrate. —S11 a protective layer is formed on the flexible substrate, and a first through hole and a second through hole are formed on an edge of the protective layer. —S12 a semiconductor layer and a bonding area pad are formed, and a data lead trace is simultaneously formed, and the gate lead trace is electrically connected to a gate of the semiconductor layer through the first through hole. —S13 a light-emitting layer is formed. —S14 a touch layer and a touch sensor transmitting electrode lead trace are formed, and the touch sensor receiving electrode lead trace is electrically connected to a touch sensor receiving electrode on the touch layer through the second through hole. —S15 a polarizer, a protective film, and a border are formed, so as to accomplish a touch display module. —S16

FLEXIBLE DISPLAY PANEL

FIELD OF DISCLOSURE

The present disclosure relates to the field of touch display devices, and in particular, to a flexible display panel and a manufacturing method thereof.

BACKGROUND

In recent years, with increasing use of consumer electronic products, more and more products have been applied by combining touch functions with displays. Touch technology has become a popular development technology because of its convenient operation and high integration.

The touch technology has developed rapidly in recent years, and a variety of touch technologies have been employed in mass production. For a current touch display panel, according to a position of a touch sensor, the touch sensor can be classified as an on-cell (the touch sensor covers a liquid crystal cell), an in-cell (the touch sensor is embedded in the liquid crystal cell), and an out-cell (the touch sensor is externally mounted on the display panel).

With advancement of technology, people are increasingly demanding quality electronic products. Under fierce competition, electronic manufacturers are aiming at beauty, lightness, thinness, and narrowness. At the same time, they hope that their liquid crystal screens can be as large as possible. Emergence of a full-screen display has made it a trend, and with a mass production of IPHONE X products, having a full screen has become an ultimate technical solution pursued by various display factories.

In order to achieve a narrow border, a touch screen currently employs an edge trace, but when minimum line width of the trace reaches the limit of process, it is impossible to continue to achieve a narrower border.

Accordingly, it is necessary to provide a new display panel to solve the technical problems in the prior art.

SUMMARY OF DISCLOSURE

An object of the present disclosure is to provide a flexible display panel that solves problems of excessive width of an edge trace of a panel in the prior art.

To achieve the above object, the present disclosure provides a flexible display panel which defines a display area, a bonding area, and a border area, and the flexible display panel includes a flexible substrate, a protective layer, a semiconductor layer, and a touch layer, wherein a gate lead trace, a ground trace, a touch sensor receiving electrode lead trace, and a display area pad are disposed on the flexible substrate corresponding to the display area; and wherein the protective layer corresponding to the border area is provided with a first through hole, and the gate lead trace is electrically connected to a gate of the semiconductor layer through the first through hole.

Furthermore, in different embodiments, the protective layer is an electrically insulating layer.

Furthermore, in different embodiments, the protective layer corresponding to the border area is provided with a second through hole, and the touch sensor receiving electrode lead trace is electrically connected to a touch sensor receiving electrode on the touch layer through the second through hole.

Furthermore, in different embodiments, a bonding area pad is disposed on the semiconductor layer, and the gate lead trace, the ground trace, and the touch sensor receiving electrode lead trace are electrically connected to the bonding area pad corresponding to the bonding area.

Furthermore, in different embodiments, a data lead trace is disposed on the semiconductor layer, and a touch sensor transmitting electrode lead trace is disposed on the touch layer, and the data lead trace and the touch sensor transmitting electrode lead trace are electrically connected to the display area pad from an end close to the bonding area.

Furthermore, in different embodiments, the flexible display panel further comprises a light-emitting layer and a polarizer; and wherein the semiconductor layer is disposed on the protective layer, the light-emitting layer is disposed on the semiconductor layer, the touch layer is disposed on the light-emitting layer, and the polarizer is disposed on the touch layer.

Furthermore, in different embodiments, the protective layer corresponding to the border area is provided with a third through hole, and a data lead trace is disposed on the flexible substrate corresponding to the display area, and the data lead trace is electrically connected to a data line of the semiconductor layer through the third through hole.

Furthermore, in different embodiments, the protective layer corresponding to the border area is provided with a fourth through hole, and a touch sensor transmitting electrode lead trace is disposed on the flexible substrate corresponding to the display area, and the touch sensor transmitting electrode lead trace is electrically connected to a touch sensor transmitting electrode on the touch layer through the fourth through hole.

Furthermore, in different embodiments, the data lead trace and the touch sensor transmitting electrode lead trace are electrically connected to the display area pad from an end away from the bonding area.

The present disclosure also provides a manufacturing method of a flexible display panel, comprising:

step S1, forming a gate lead trace, a ground trace, a touch sensor receiving electrode lead trace, and a display area pad on a flexible substrate corresponding to a display area;

step S2, forming a protective layer on the flexible substrate, and forming a first through hole on the protective layer corresponding to a border area;

step S3, forming a semiconductor layer, and electrically connecting the gate lead trace to a gate of the semiconductor layer through the first through hole;

step S4, forming a light-emitting layer;

step S5, forming a touch layer;

step S6, forming a polarizer, a protective film, and a border to accomplish a touch display module.

In comparison to the prior art, the present disclosure has advantages that the present disclosure provides a flexible display panel and a manufacturing method thereof, in which a traditional trace position is changed, and a hidden trace design is adopted. The trace and a display area are designed in the same position, so that no additional space is occupied, and a non-display area is reduced, thereby effectively reducing a width of the trace in an edge of a panel. It can even achieve zero edge width, increase a screen-to-body ratio, and reduce materials used in the same size. Furthermore, touch and display are integrated to achieve a narrow border solution, and a bonding area can also achieve a very narrow border.

BRIEF DESCRIPTION OF DRAWINGS

In order to more clearly describe the technical solutions of the embodiments of the present disclosure, accompanying drawings to be used in the detailed description of the disclosure will be briefly described hereinbelow. Obviously, the accompanying drawings described hereinbelow only illustrate some of the embodiments of the present disclosure, and those of ordinary skill in the art can also obtain other accompanying drawings therefrom without the need of making inventive efforts.

DETAILED DESCRIPTION

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The specific structure and functional details disclosed here are only representative for the purpose of describing the exemplary embodiments of the present disclosure. However, the present disclosure may be specifically implemented through many alternative manners and should not be interpreted as being only limited to the embodiments illustrated herein.

In the description of the present disclosure, it should be understood that the terms "central", "transversal", "upper", "lower", "left", "right", "vertical", "horizontal", "top", "bottom", "inner", "outer" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure. In addition, terms of "first", "second" are only used for description, but shall not be understood as indication or implication of relative importance or implicit indication of the number of the specific technical features. Therefore, the features defined by the terms "first" and "second" may explicitly or implicitly include one or more of these features. In the description of the present disclosure, the term "more" or "a plurality of" signifies at least two, unless otherwise specified. Moreover, the term "include" and any other variants mean to cover the non-exclusive inclusion.

In the present disclosure, except where specifically otherwise illustrated or limited, the terms "install", "connect", "link" and "fix" used herein should be understood in a broad sense. Such as, the meaning may be fixedly connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

The terms used here are only for describing preferred embodiments, not intended to limit the exemplary embodiments. Unless otherwise explicitly indicated in the context, the singular forms "a" and "one" as used here also intend to include plurality. It should also be understood that the terms "comprise" and/or "include" used here prescribe existence of the stated feature, integer, step, operation, unit and/or component, without excluding existence or addition of one or more other features, integers, steps, operations, units, components and/or combinations thereof.

First Embodiment

Figure 1A:
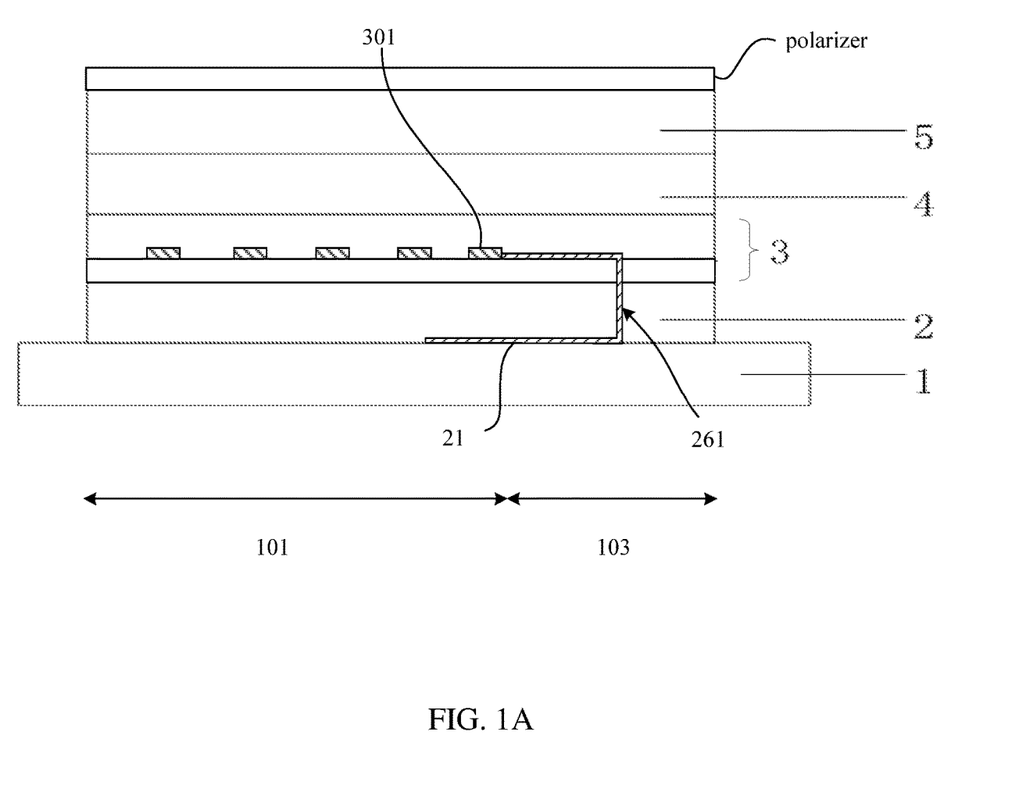
FIG. 1A-FIG. 1D are cross-sectional views of a flexible display panel in accordance with an embodiment of the present disclosure.
Figure 1B:
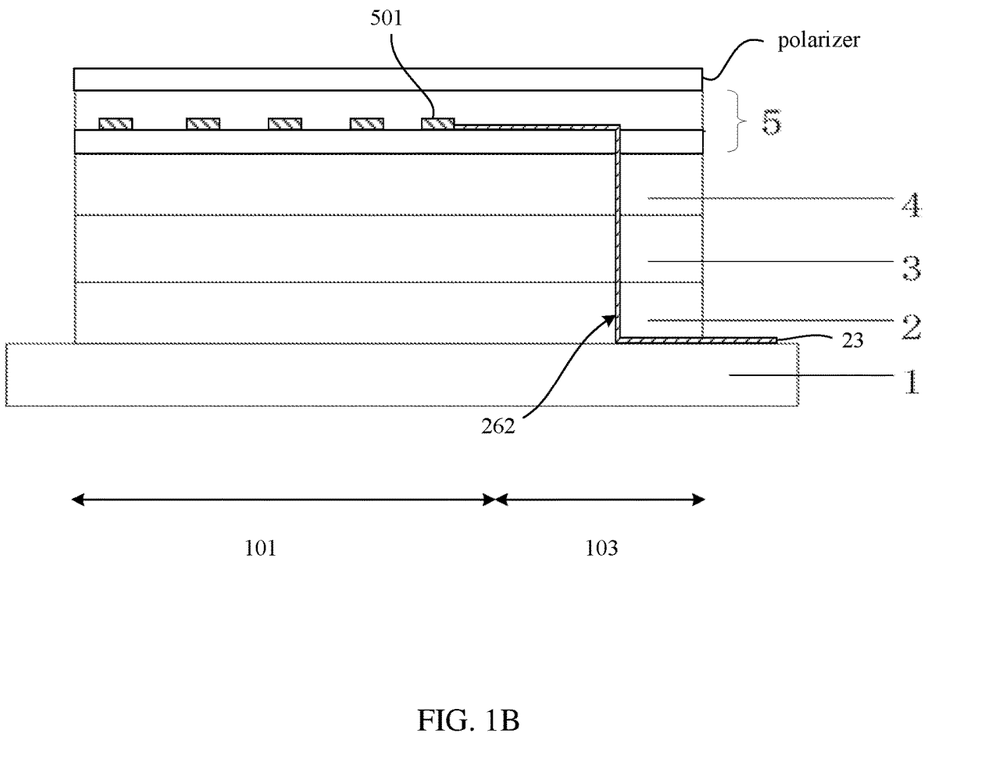
Figure 1C:
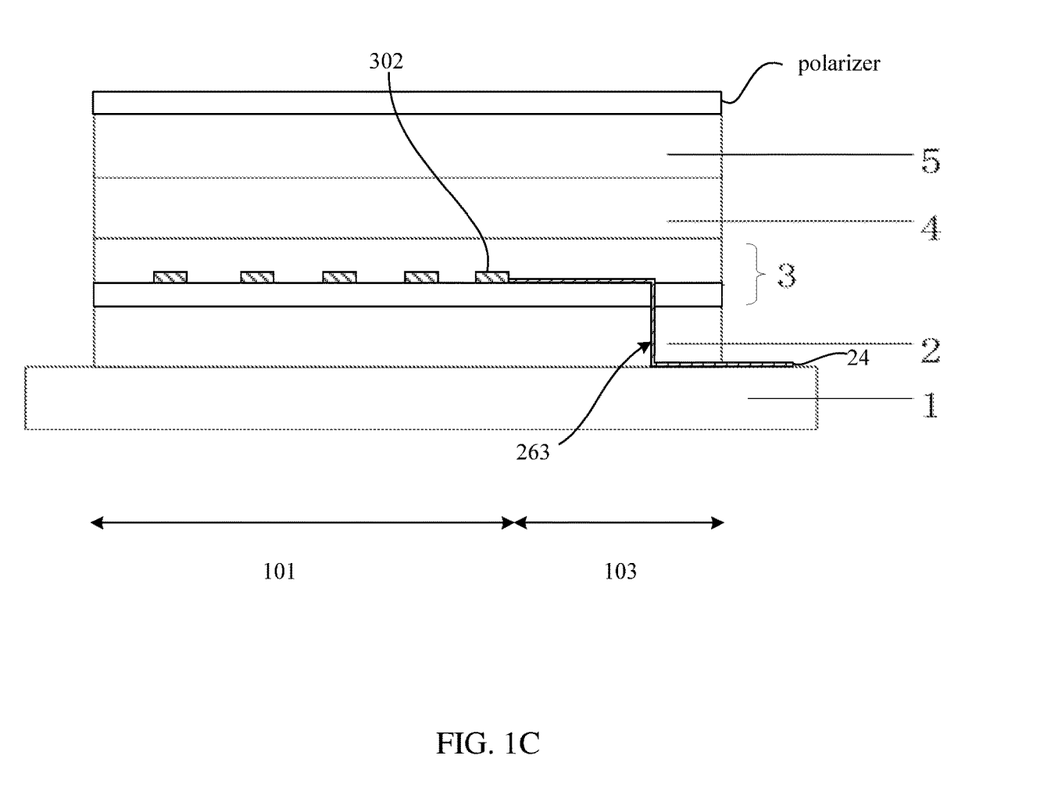
Figure 1D:
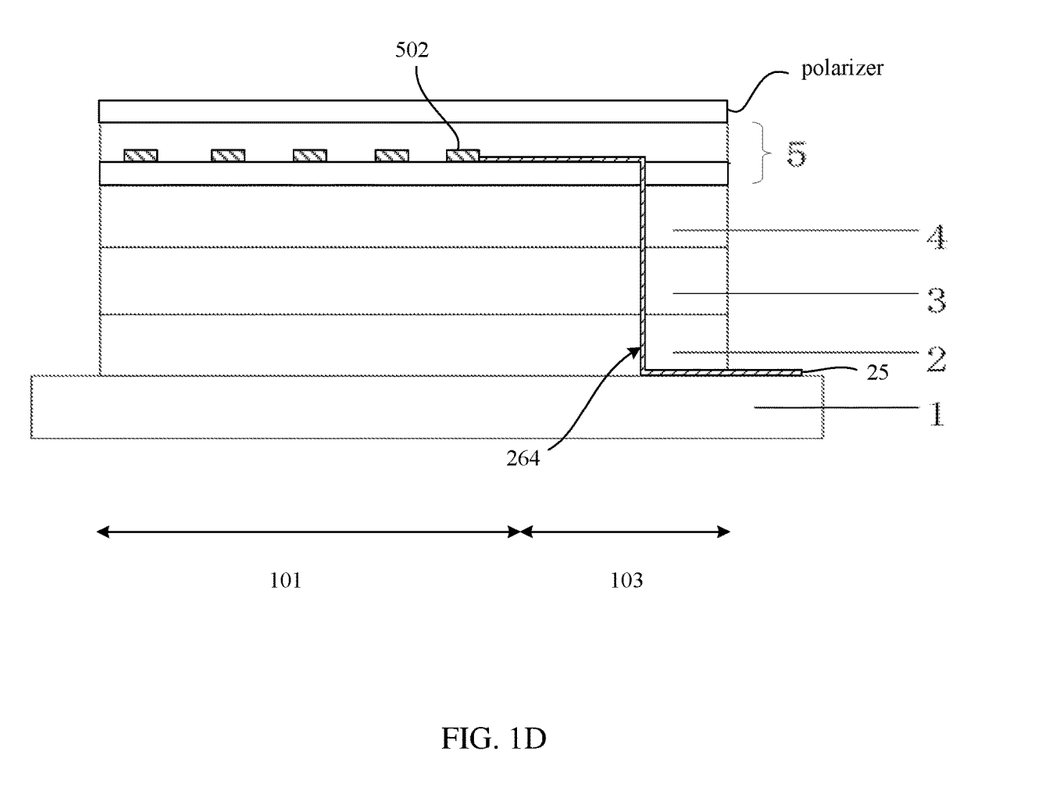
Figure 2:
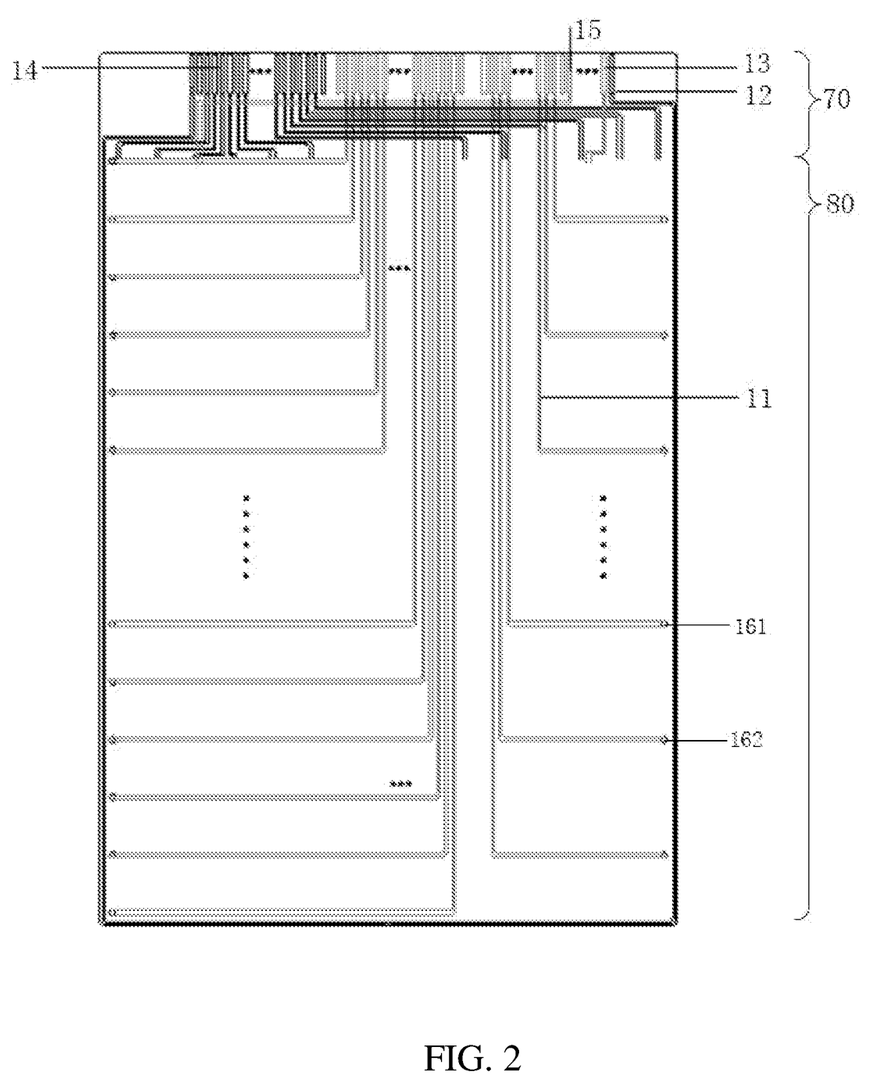
FIG. 2 is a schematic diagram of a lead trace distribution of a flexible display panel according to a first embodiment of the present disclosure.
Figure 3:
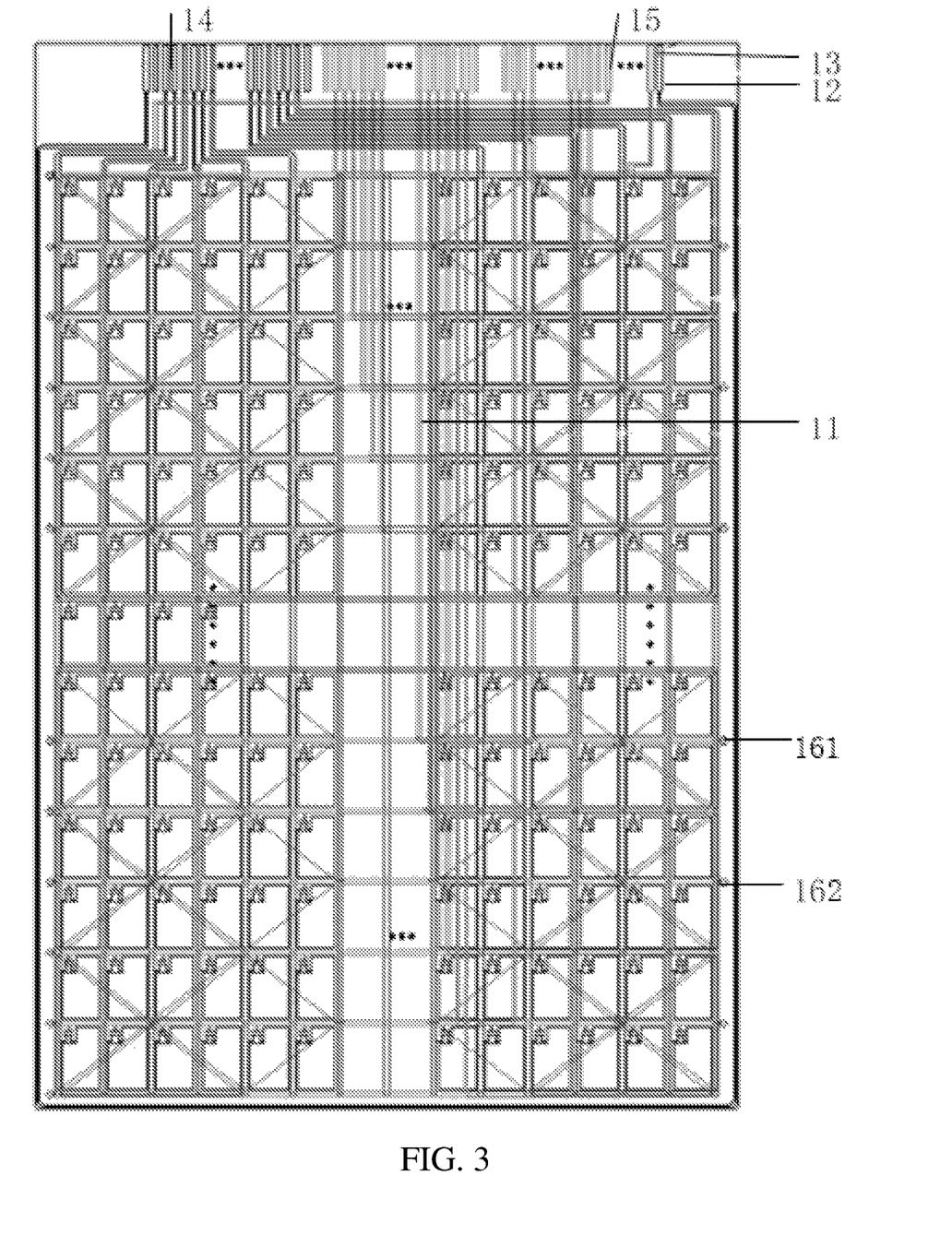
FIG. 3 is a schematic diagram showing relative positions of lead traces and a display area of the flexible display panel according to the first embodiment of the present disclosure.

Referring to FIG. 1, FIG. 2, and FIG. 3, the present provides a flexible display panel defining a display area, a bonding area, and a border area. The flexible display panel includes a flexible substrate 1, a protective layer 2, a semiconductor layer 3, a light-emitting layer 4, and a touch layer 5.

The flexible substrate 1 corresponding to the display area is provided with a gate lead trace 11, a ground trace 12, a touch sensor receiving electrode lead trace 13, and a display area pad 80. The protective layer 2 corresponding to the border area is provided with a first through hole 161 and a second through hole 162. The gate lead trace 11 is electrically connected to a gate of the semiconductor layer 3 through the first through hole 161. The touch sensor receiving electrode lead trace 13 is electrically connected to a touch sensor receiving electrode on the touch layer 5 through the second through hole 162.

The protective layer 2 is an electrically insulating layer that protects all traces on flexible substrate 1.

A data lead trace 14 and a bonding area pad 70 are also provided in the semiconductor layer 3. The gate lead trace 11, the ground trace 12, and the touch sensor receiving electrode lead trace 13 are electrically connected to the bonding area pad 70 in the bonding area. The touch layer 5 is also provided with a touch sensor transmitting electrode lead trace 15. The data lead trace 14 and the touch sensor transmitting electrode lead trace 15 are electrically connected to the display area pad 80 from an end close to the bonding area.

Second Embodiment

Figure 4:
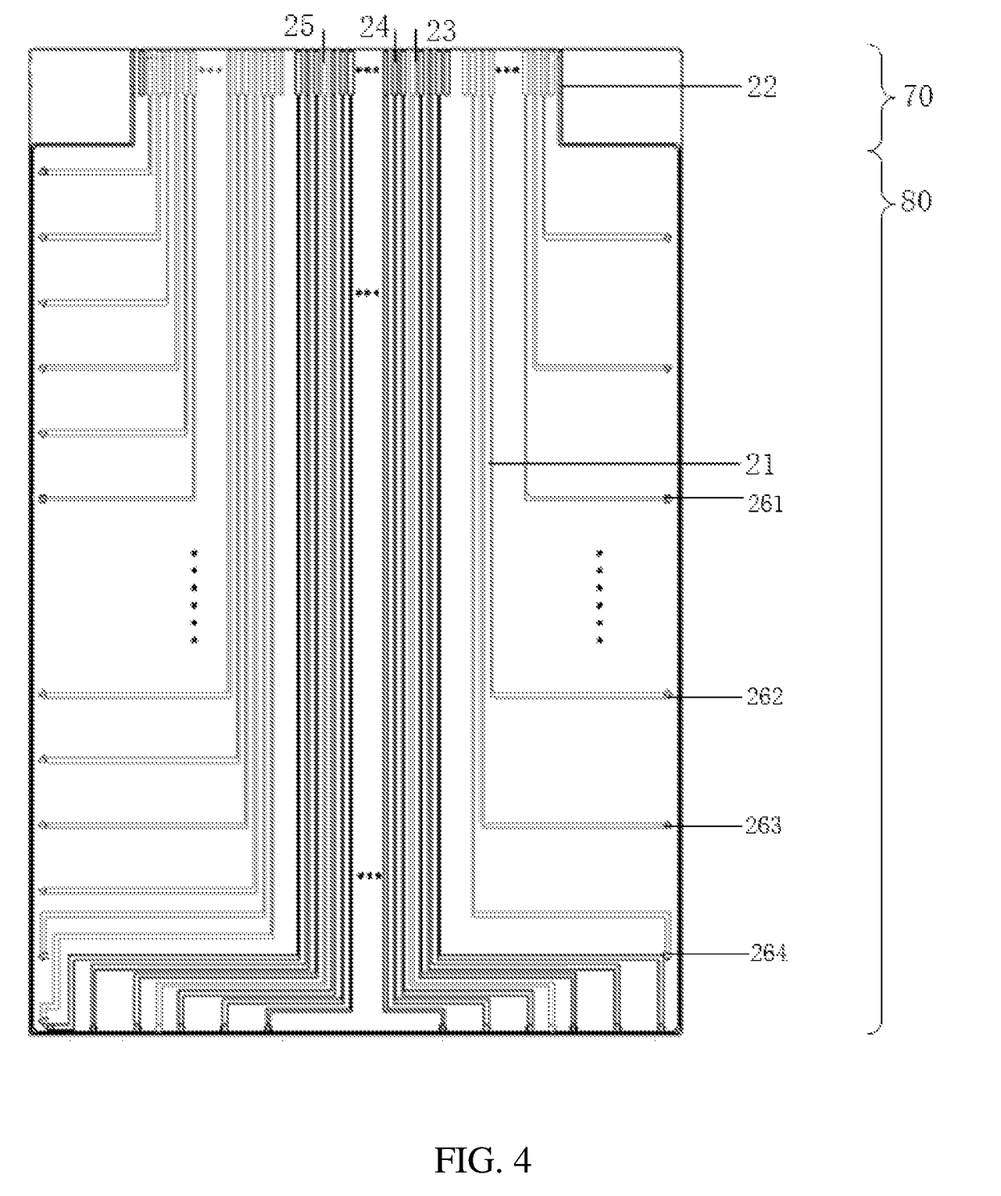
FIG. 4 is a schematic diagram of a lead trace distribution of a flexible display panel according to a second embodiment of the present disclosure.
Figure 5:
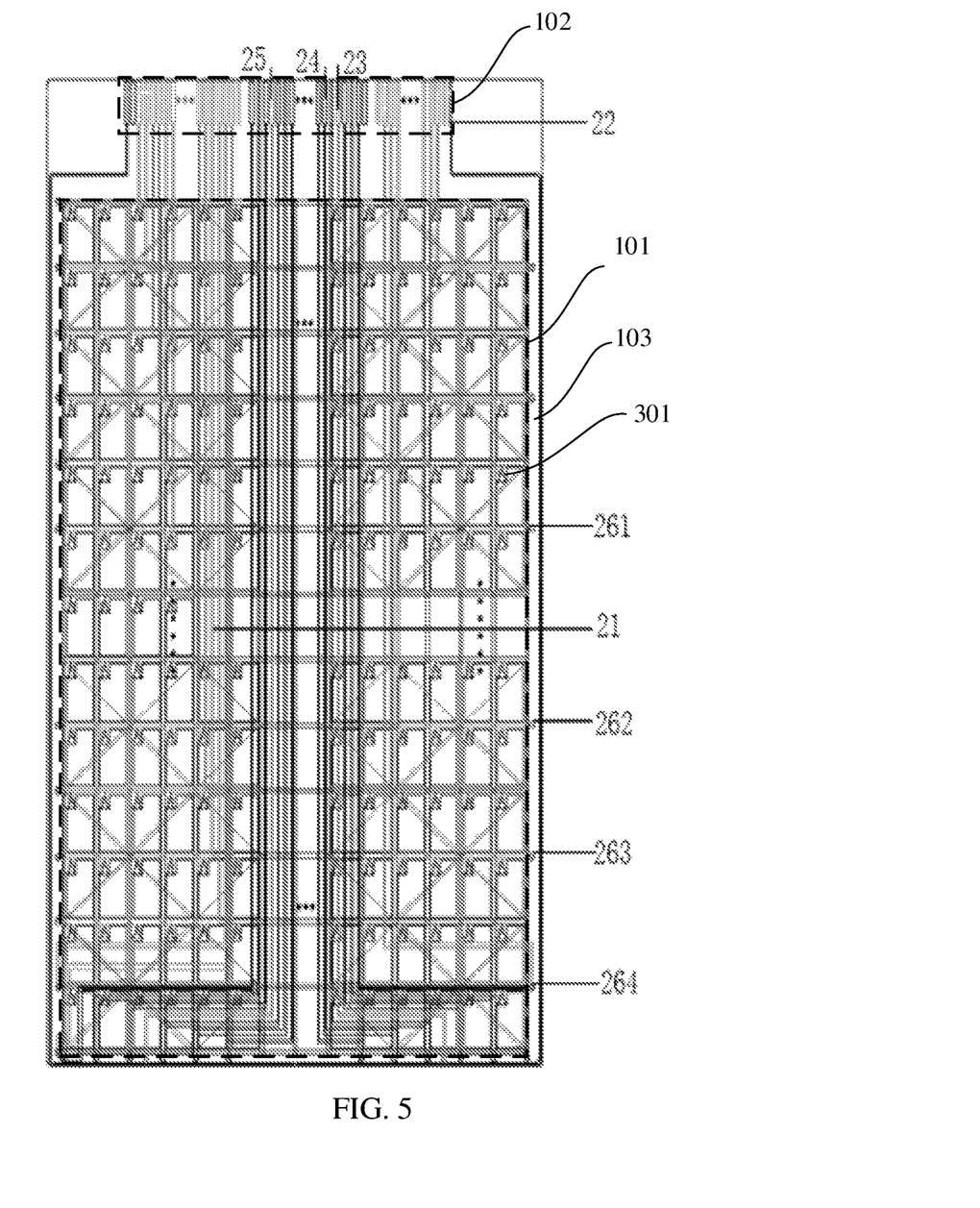
FIG. 5 is a schematic diagram showing relative positions of lead traces and a display area of the flexible display panel according to the second embodiment of the present disclosure.

Referring to FIG. 1, FIG. 4, and FIG. 5, the present also provides a flexible display panel defining a display area 101, a bonding area 102, and a border area 103. The flexible display panel includes a flexible substrate 1, a protective layer 2, a semiconductor layer 3, a light-emitting layer 4, and a touch layer 5.

The flexible substrate 1 corresponding to the display area 101 is provided with a gate lead trace 21, a ground trace 22, a touch sensor receiving electrode lead trace 23, a data lead trace 24, a touch sensor transmitting electrode lead trace 25, and a display area pad 80. An end of the protective layer 2 corresponding to the border area 103 is provided with a first through hole 261, a second through hole 262, a third through hole 263, and a fourth through hole 264. The gate lead trace 21 is electrically connected to a gate 301 of the semiconductor layer 3 through the first through hole 261. The touch sensor receiving electrode lead trace 23 is electrically connected to a touch sensor receiving electrode 501 on the touch layer 5 through the second through hole 262. The data lead trace 24 is electrically connected to a data line 302 of the semiconductor layer 3 through the third through hole 263. The touch sensor transmitting electrode lead trace 25 is electrically connected to the touch sensor transmitting electrode 502 on the touch layer 5 through the fourth through hole 264.

The data lead trace 24 and the touch sensor transmitting electrode lead trace 25 are electrically connected to the display area pad 80 from an end away from the bonding area.

Third Embodiment

Figure 6:
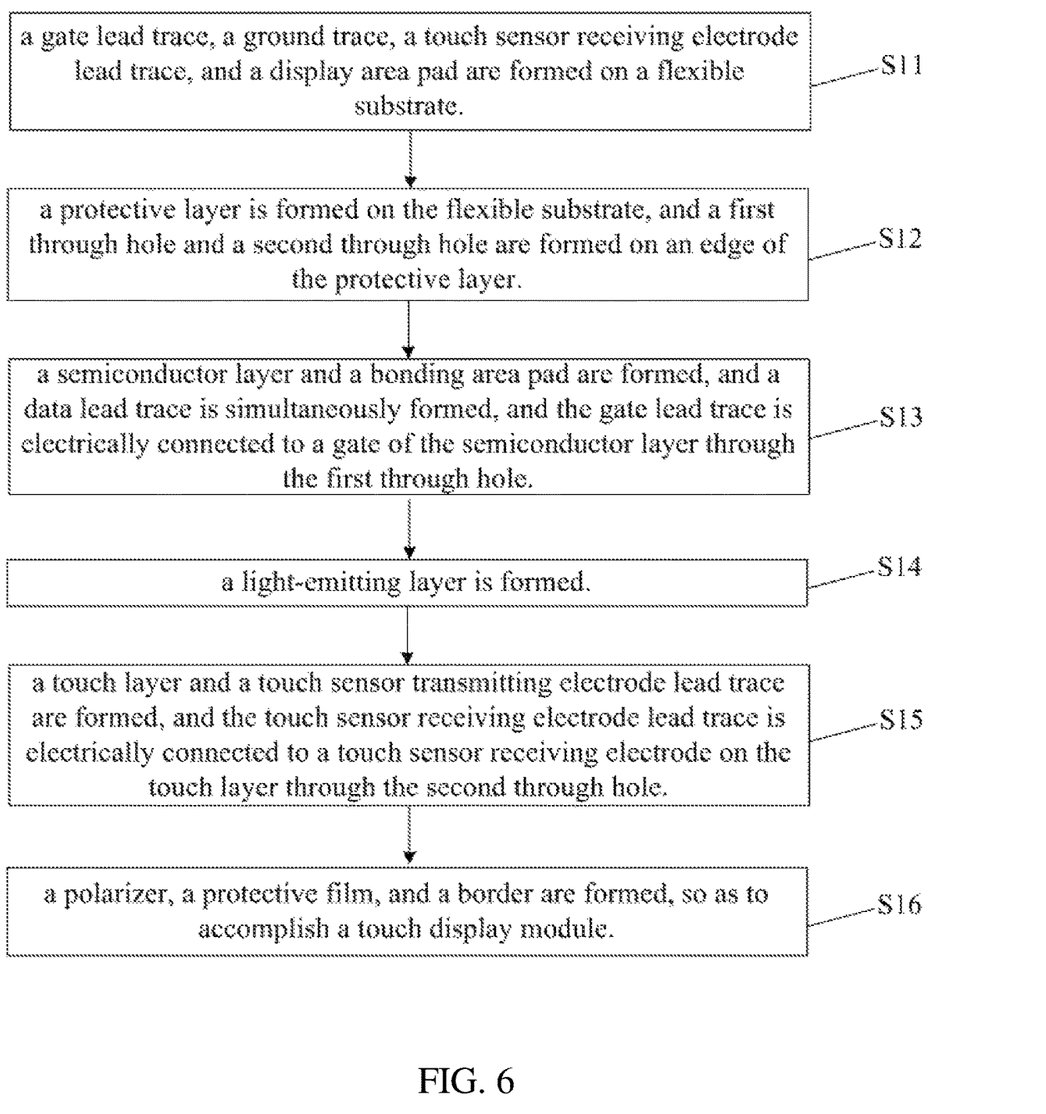
FIG. 6 is a flowchart of a manufacturing method of a flexible display panel according a third embodiment of the present disclosure.

Referring to FIG. 6, the present disclosure also provides a manufacturing method of a flexible display panel, which includes following steps.

In step S11, a gate lead trace 11, a ground trace 12, a touch sensor receiving electrode lead trace 13, and a display area pad 80 are formed on a flexible substrate 1 corresponding to a display area.

In step S12, a protective layer 2 is formed on the flexible substrate 1, and a first through hole 161 and a second through hole 162 are formed on an edge of the protective layer 2 corresponding to a border area.

The protective layer 2 is an electrically insulating layer that protects all traces on flexible substrate 1.

In step S13, a semiconductor layer 3 and a bonding area pad 70 are formed, and a data lead trace 14 is simultaneously formed, and the gate lead trace 11 is electrically connected to a gate of the semiconductor layer 3 through the first through hole 161.

The gate lead trace 11, the ground trace 12, and the touch sensor receiving electrode lead trace 13 are electrically connected to the bonding area pad 70 in a bonding area.

In step S14, a light-emitting layer 4 is formed.

In step S15, a touch layer 5 and a touch sensor transmitting electrode lead trace 15 are formed, and the touch sensor receiving electrode lead trace 13 is electrically connected to a touch sensor receiving electrode on the touch layer 5 through the second through hole 162.

The data lead trace 14 and the touch sensor transmitting electrode lead trace 15 are electrically connected to the display area pad 80 from an end close to the bonding area.

In step S16, a polarizer, a protective film, and a border are formed, so as to accomplish a touch display module.

This embodiment can realize a narrow border design, and can also realize that a display bonding area and a touch bonding area are separately, such that it is convenient to independently design an integrated circuit. However, there are also lead traces that cross each other, although they are not on the same layer, and there is an electrically insulating layer in the middle to protect. However, due to a messy layout of the lead traces and a signal interference between them, this will generate an additional burden on the integrated circuit. Moreover, the lead traces of the bonding area occupy a certain space, resulting in a relatively wide border of the bonding area. In order to improve this situation, another embodiment is now provided.

Fourth Embodiment

Figure 7:
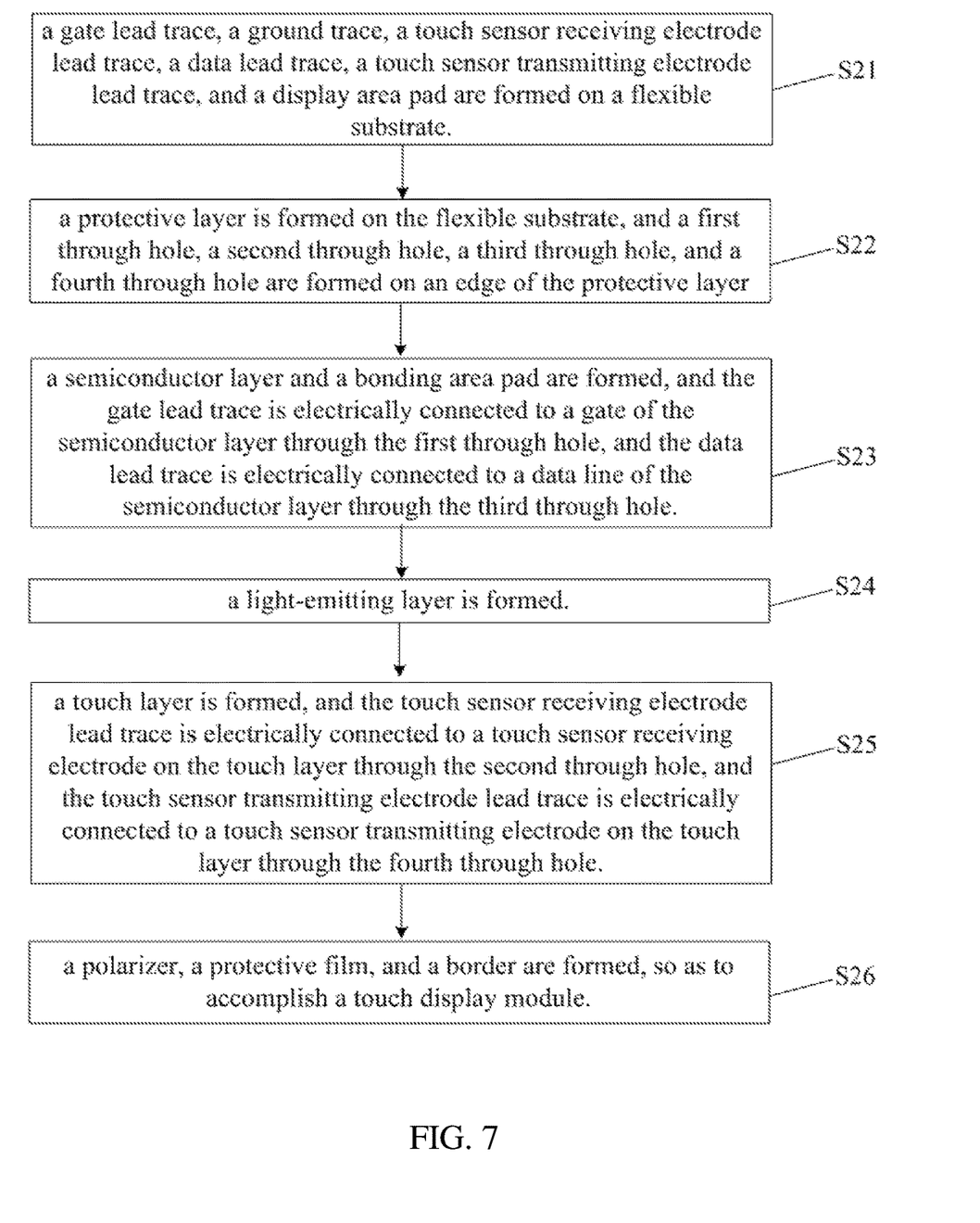
FIG. 7 is a flowchart of a manufacturing method of a flexible display panel according a fourth embodiment of the present disclosure.

Referring to FIG. 7, the present disclosure also provides a manufacturing method of a flexible display panel, which includes following steps.

In step S21, a gate lead trace 21, a ground trace 22, a touch sensor receiving electrode lead trace 23, a data lead trace 24, a touch sensor transmitting electrode lead trace 25, and a display area pad 80 are formed on a flexible substrate 1 corresponding to a display area.

The data lead trace 24 and the touch sensor transmitting electrode lead trace 25 are introduced from an end away from the bonding area.

In step S22, a protective layer 2 is formed on the flexible substrate 1, and a first through hole 261, a second through hole 262, a third through hole 263, and a fourth through hole 264 are formed on an edge of the protective layer 2 corresponding to a border area.

The protective layer 2 is an electrically insulating layer that protects all traces on flexible substrate 1.

In step S23, a semiconductor layer 3 and a bonding area pad 70 are formed, and the gate lead trace 21 is electrically connected to a gate of the semiconductor layer 3 through the first through hole 261, and the data lead trace 24 is electrically connected to a data line of the semiconductor layer 3 through the third through hole 263.

In step S24, a light-emitting layer 4 is formed.

In step S25, a touch layer 5 is formed, and the touch sensor receiving electrode lead trace 23 is electrically connected to a touch sensor receiving electrode on the touch layer 5 through the second through hole 262, and the touch sensor transmitting electrode lead trace 25 is electrically connected to a touch sensor transmitting electrode on the touch layer 5 through the fourth through hole 264.

The data lead trace 24 and the touch sensor transmitting electrode lead trace 25 are electrically connected to the display area pad 80 from an end away from the bonding area.

In step S26, a polarizer, a protective film, and a border are formed, so as to accomplish a touch display module.

Advantages of the fourth embodiment over the third embodiment are that a position adjustment is introduced by the data lead trace and the touch sensor transmitting electrode lead trace, so that all the lead traces are hidden under the semiconductor layer and are not visible, thereby reducing a space occupied by the lead traces in the bonding area. Thus, there are only pads at the bonding area, and a border width of the bonding area can be adjusted according to a size of the bonding area pad and the special layout requirement, thereby greatly reducing the width of the bonding area. However, this embodiment has a limitation: type of integrated circuit can only be an integrated circuit of the touch and display drivers.

All the lead traces in the above embodiments use transparent circuit traces inside the display area, and a transparent circuit trace or an opaque metal trace can be used in the bonding area.

The touch sensor mode of the present disclosure can be either an on-cell mode or am in-cell mode, which belong to a narrow border technology of the present disclosure. The touch layer in the manufacturing step can be adjusted according to the on-cell mode or the in-cell mode.

The present disclosure has advantages that a traditional trace position is changed, and a hidden trace design is adopted. The trace and a display area are designed in the same position, so that no additional space is occupied, and a non-display area is reduced, thereby effectively reducing a width of the trace in an edge of a panel. It can even achieve zero edge width, increase a screen-to-body ratio, and reduce materials used in the same size. Furthermore, touch and display are integrated to achieve a narrow border solution, and a bonding area can also achieve a very narrow border.

The above descriptions are merely preferable embodiments of the present disclosure. Any modification or replacement made by those skilled in the art without departing from the principle of the present disclosure should fall within the protection scope of the present disclosure.

What is claimed is:

1. A flexible display panel, defining a display area, a bonding area, and a border area, and comprising:
    a flexible substrate, wherein a gate lead trace, a ground trace, a touch sensor receiving electrode lead trace, and a display area pad are disposed on the flexible substrate, and the gate lead trace and the touch sensor receiving electrode lead trace extend from the bonding area through the display area to the border area;
    a protective layer disposed on the flexible substrate, wherein the protective layer corresponding to the border area is provided with a first through hole and a second through hole;
    a semiconductor layer disposed on the protective layer, wherein the semiconductor layer comprises a gate; and
    a touch layer disposed on the semiconductor layer, wherein the gate lead trace on the flexible substrate is electrically connected to the gate of the semiconductor layer through the first through hole in the border area, and the touch sensor receiving electrode lead trace is electrically connected to a touch sensor receiving electrode on the touch layer through the second through hole.

2. The flexible display panel as claimed in claim 1, wherein the flexible display panel further comprises a light-emitting layer and a polarizer; and wherein the semiconductor layer is disposed on the protective layer, the light-emitting layer is disposed on the semiconductor layer, the touch layer is disposed on the light-emitting layer, and the polarizer is disposed on the touch layer.

3. The flexible display panel as claimed in claim 1, wherein the protective layer corresponding to the border area is provided with a third through hole, and a data lead trace is disposed on the flexible substrate corresponding to the bonding area, and the data lead trace is electrically connected to a data line of the semiconductor layer through the third through hole.

4. The flexible display panel as claimed in claim 1, wherein the protective layer corresponding to the border area is provided with a fourth through hole, and a touch sensor transmitting electrode lead trace is disposed on the flexible substrate corresponding to the bonding area, and the touch sensor transmitting electrode lead trace is electrically connected to a touch sensor transmitting electrode on the touch layer through the fourth through hole.

5. The flexible display panel as claimed in claim 4, wherein a data lead trace and the touch sensor transmitting electrode lead trace are electrically connected to the display area pad from an end away from the bonding area.

* * * * *